US010432651B2

(12) United States Patent
Pangeni et al.

(10) Patent No.: US 10,432,651 B2
(45) Date of Patent: Oct. 1, 2019

(54) SYSTEMS AND METHODS TO DETECT AND MONITOR DNS TUNNELING (71) Applicant: Zscaler, Inc., San Jose, CA (US)

(72) Inventors: Sushil Pangeni, Fremont, CA (US); Vladimir Stepanenko, Sunnyvale, CA (US); Ravinder Verma, Freemont, CA (US); Srikanth Devarajan, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 166 days.

(21) Appl. No.: 15/679,519

(22) Filed: Aug. 17, 2017

(65) Prior Publication Data
US 2019/0058718 A1 Feb. 21, 2019

(51) Int. Cl.
*H04L 29/06* (2006.01)
*H04L 29/12* (2006.01)
*H04L 12/26* (2006.01)

(52) U.S. Cl.
CPC ...... *H04L 63/1425* (2013.01); *H04L 61/1511* (2013.01); *H04L 63/1466* (2013.01); *H04L 43/08* (2013.01)

(58) Field of Classification Search
CPC ............. H04L 63/1425; H04L 65/1511; H04L 63/1466; H04L 43/08
USPC .......................................................... 726/22
See application file for complete search history.

(56) References Cited

U.S. PATENT DOCUMENTS

| 8,010,085 | B2* | 8/2011 | Apte | G06F 21/577 370/338 |
| 9,065,800 | B2* | 6/2015 | Devarajan | G06F 21/51 |
| 2008/0155694 | A1* | 6/2008 | Kwon | H04L 29/12066 726/23 |
| 2011/0145316 | A1* | 6/2011 | Ait-Ameur | H04L 29/12066 709/203 |
| 2012/0054860 | A1* | 3/2012 | Wyschogrod | H04L 29/12066 726/22 |
| 2012/0159623 | A1* | 6/2012 | Choi | H04L 61/1511 726/22 |
| 2016/0065611 | A1* | 3/2016 | Fakeri-Tabrizi | H04L 63/1425 726/23 |
| 2016/0099961 | A1* | 4/2016 | Paugh | G06F 16/90335 726/23 |
| 2016/0294773 | A1* | 10/2016 | Yu | H04L 63/1425 |
| 2016/0359887 | A1* | 12/2016 | Yadav | H04L 63/1425 |
| 2017/0105142 | A1* | 4/2017 | Hecht | H04L 69/04 |

(Continued)

OTHER PUBLICATIONS

Farnham, Detecting DNS Tunneling, SANS Institute, Jun. 2012.

*Primary Examiner* — Taghi T Arani
*Assistant Examiner* — Badri Champakesan
(74) *Attorney, Agent, or Firm* — Clements Bernard Walker PLLC; Lawrence A. Baratta, Jr.

(57) ABSTRACT

Systems and methods of detecting Domain Name System (DNS) tunnels for monitoring thereof include obtaining data related to DNS traffic between DNS nameservers and clients; determining a score for each DNS nameserver based on the data to characterize DNS queries over a period of time for each DNS nameserver, wherein the score incorporates all DNS queries associated with the associated DNS nameserver over the period of time; determining one or more DNS nameservers likely operating DNS tunnels based on the score; and performing one or more actions on the one or more DNS nameservers related to the DNS tunnels.

17 Claims, 7 Drawing Sheets

(56) References Cited

U.S. PATENT DOCUMENTS

2017/0171242 A1*  6/2017  Akcin ................. H04L 63/1466
2017/0323102 A1* 11/2017  Manadhata ......... H04L 61/1511
2018/0063162 A1*  3/2018  Baughman .......... H04L 63/1416
2018/0115582 A1*  4/2018  Thakar ................ H04L 63/1466
2018/0278633 A1*  9/2018  Brutzkus ............. H04L 63/1425

* cited by examiner

SYSTEMS AND METHODS TO DETECT AND MONITOR DNS TUNNELING

FIELD OF THE DISCLOSURE

The present disclosure generally relates to networking systems and methods. More particularly, the present disclosure relates to systems and methods to detect and monitor Domain Name System (DNS) tunneling.

BACKGROUND OF THE DISCLOSURE

DNS is a foundational application layer protocol used in networking and used, for example, to translate domain names (example.com) into numerical Internet Protocol (IP) addresses (101.1.1.101). DNS is generally not intended for general data transfer. However, several approaches have been developed for so called DNS tunneling, namely using DNS for general data communication. Disadvantageously, DNS traffic is monitored with less attention in terms of security monitoring. Thus, DNS tunneling has been seen as a technique to circumvent security measures. DNS tunneling was originally developed as a simple technique to bypass endpoints at the network edge, but it has evolved and is often used for nefarious purposes. DNS tunneling uses DNS queries and responses for communication by other programs or protocols to bypass firewall or network security. For DNS tunneling to work, the end DNS nameserver must be a modified name server than can extract and process data from DNS queries. Current techniques to detect DNS tunneling focus on analyzing individual DNS requests and responses. While these techniques can detect individual instances of DNS tunneling, these techniques do not provide insight into the overall pattern of the DNS tunnel traffic. Further, it is possible to avoid detection by carefully manipulating the actual requests and response contents.

BRIEF SUMMARY OF THE DISCLOSURE

In an exemplary embodiment, a method of detecting Domain Name System (DNS) tunnels for monitoring thereof includes obtaining data related to DNS traffic between DNS nameservers and clients; determining a score for each DNS nameserver based on the data to characterize DNS queries over a period of time for each DNS nameserver, wherein the score incorporates all DNS queries associated with the associated DNS nameserver over the period of time; determining one or more DNS nameservers likely operating DNS tunnels based on the score; and performing one or more actions on the one or more DNS nameservers related to the DNS tunnels. The score can be a combination of DNS traffic length of both requests and responses, entropy of each request, variation of each request, and a number of unique clients. The score can be determined for all possible hostnames observed in a domain. The score in part can represent a number of the clients to an associated DNS nameserver such that the number of clients is used to narrow detection of the DNS tunnels. The score in part can account for entropy of each request and variation of each request to determine the DNS tunnels based thereon. The one or more actions can include blocking the DNS tunnel through a distributed security system. An authoritative DNS nameserver for a particular domain can be unknown and determined based on the score. The obtaining data can be from a distributed security system with one or more cloud nodes operating as DNS proxies for the clients and wherein the performing one or more actions can be through the distributed security system. The obtaining data, the determining the score, and the determining the one or more DNS nameservers likely operating DNS tunnels can be performed periodically, and the method can further include updating a distributed security system for monitoring of the one or more DNS nameservers likely operating DNS tunnels.

In another exemplary embodiment, a Domain Name System (DNS) tunnel detection system includes a network interface; a processor communicatively coupled to the network interface; and memory storing instructions that, when executed, cause the processor to: obtain data related to DNS traffic between DNS nameservers and clients; determine a score for each DNS nameserver based on the data to characterize DNS queries over a period of time for each DNS nameserver, wherein the score incorporates all DNS queries associated with the associated DNS nameserver over the period of time; determine one or more DNS nameservers likely operating DNS tunnels based on the score; and provide the one or more DNS nameservers likely operating DNS tunnels to a distributed security system for performance of one or more actions related to the DNS tunnels. The score can be a combination of DNS traffic length of both requests and responses, entropy of each request, variation of each request, and a number of unique clients. The score can be determined for all possible hostnames observed in a domain. The score in part can represent a number of the clients to an associated DNS nameserver such that the number of clients is used to narrow detection of the DNS tunnels. The score in part can account for entropy of each request and variation of each request to determine the DNS tunnels based thereon. An authoritative DNS nameserver for a particular domain can be unknown and determined based on the score. The data can be obtained from the distributed security system with one or more cloud nodes operating as DNS proxies for the clients.

In a further exemplary embodiment, a distributed security system configured to detect and monitor Domain Name System (DNS) tunnels includes one or more cloud nodes operating as DNS proxies for one or more clients; a log node communicatively coupled to the one or more cloud nodes; and a DNS tunneling detection system communicatively coupled to the one or more cloud nodes and the log node, wherein the DNS tunneling detection system is configured to obtain data related to DNS traffic between DNS nameservers and clients from the log node; determine a score for each DNS nameserver based on the data to characterize DNS queries over a period of time for each DNS nameserver, wherein the score incorporates all DNS queries associated with the associated DNS nameserver over the period of time; determine one or more DNS nameservers likely operating DNS tunnels based on the score; and provide the one or more DNS nameservers likely operating DNS tunnels to the one or more cloud nodes for performance of one or more actions related to the DNS tunnels. The score can be a combination of DNS traffic length of both requests and responses, entropy of each request, variation of each request, and a number of unique clients. The score can be determined for all possible hostnames observed in a domain. The score in part can represent a number of the clients to an associated DNS nameserver such that the number of clients is used to narrow detection of the DNS tunnels.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a mobile device, which may be used in the cloud-based system of FIG. 1 or the like;

DETAILED DESCRIPTION OF THE DISCLOSURE

Again, in various exemplary embodiments, the present disclosure relates to systems and methods to detect and monitor Domain Name System (DNS) tunneling. Specifically, the systems and methods do not focus on the individual content of DNS requests and responses, but rather analyzes the overall traffic pattern of DNS for a given hostname over a period of time. As such, the systems and methods can detect DNS tunneling despite manipulations of individual DNS requests and responses and can characterize the traffic pattern and use of DNS tunneling. In a cloud-based security system, the systems and methods can quickly detect and isolate compromised nameservers used in DNS tunneling. Advantageously, the systems and methods can detect DNS tunneling traffic that could be potentially used for malicious intent. In addition to detecting DNS tunneling, the systems and methods allow fingerprinting of the DNS traffic itself based on its key traffic properties. In an exemplary embodiment, the systems and methods can be performed inline as part of a cloud-based security system, allowing Software-as-a-Service (SaaS)-based security systems to take action based on the detection.

The systems and methods include defined properties for DNS tunneling based traffic. Further, the systems and methods can calculate quantitative metrics for the properties and use these quantitative metrics to mathematically score DNS nameservers based on its likelihood of serving as a DNS tunnel endpoint. The systems and methods can determine potential authoritative nameservers purely from the dataset itself, i.e., without explicit information. The systems and methods can score all of the potential authoritative nameservers for a given domain name, for detection of possible DNS tunneling. In an exemplary embodiment, the systems and methods can detect DNS tunneling in a cloud deployment, i.e., a Software-as-a-Service (SaaS) setup. Also, the systems and methods contemplate operation inline (cloud, SaaS, etc.) as well as offline detection (from logs, etc.).

Exemplary Cloud System Architecture

Figure 1:
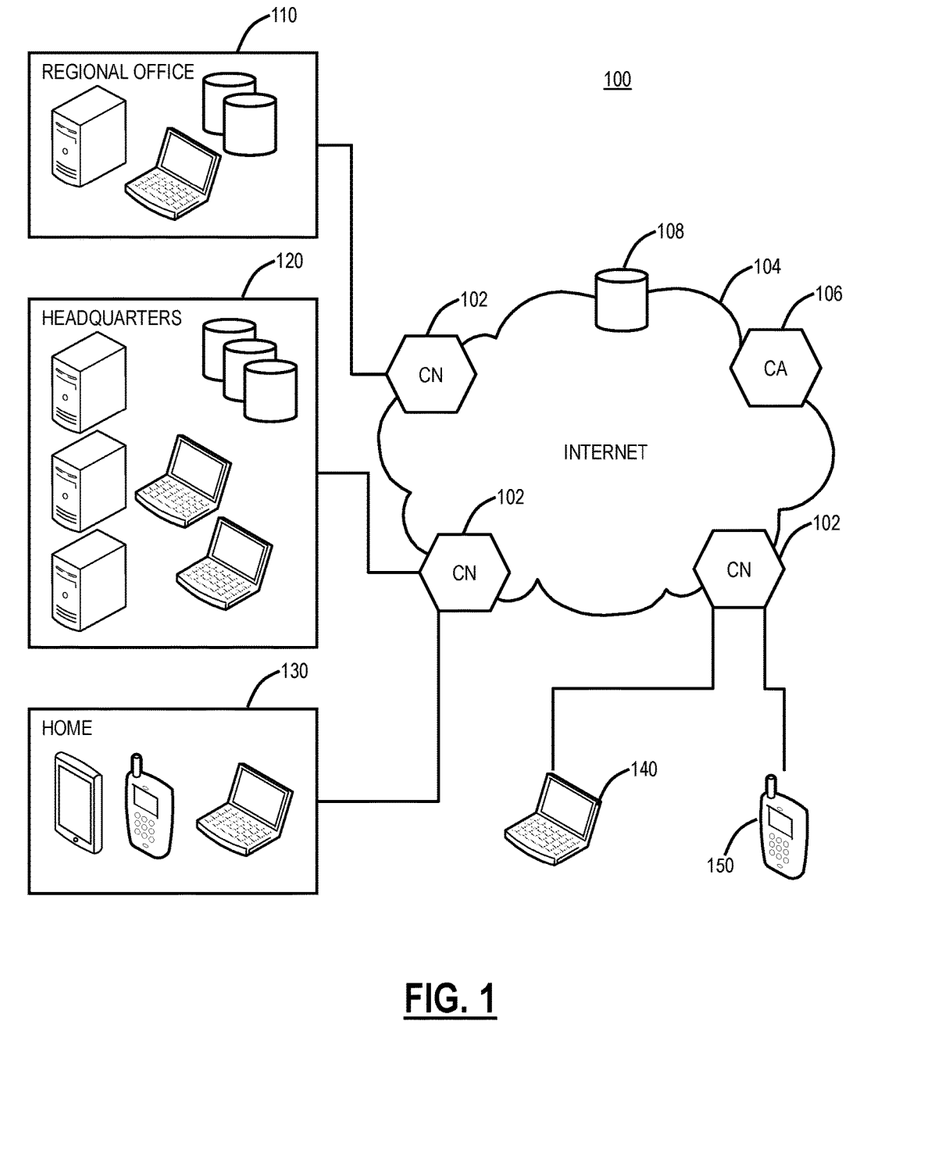
FIG. 1 is a network diagram of a cloud-based system for implementing various cloud-based service functions.
Figure 2:
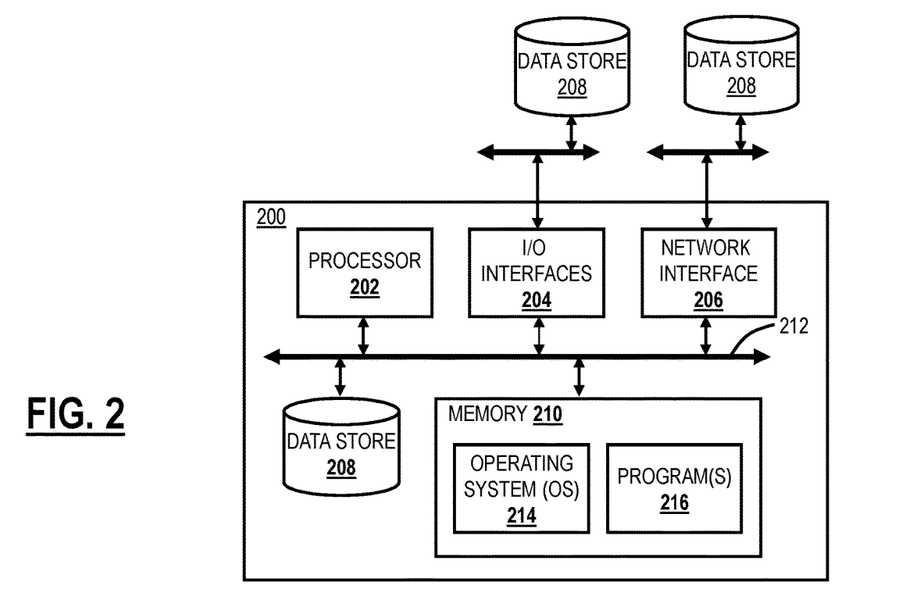
FIG. 2 is a block diagram of a server which may be used in the cloud-based system of FIG. 1, in other systems, or stand-alone.

Referring to FIG. 1, in an exemplary embodiment, a network diagram illustrates a cloud-based system 100 for implementing various cloud-based service functions. The cloud-based system 100 includes one or more cloud nodes (CN) 102 communicatively coupled to the Internet 104 or the like. Also, the cloud-based system 100 can also include one or more central authorities (CA) 106 and one or more log nodes 108, and each of the components 102, 106, 108 can be communicatively coupled to one another via the Internet 104. The cloud nodes 102, the central authorities 106, and the log nodes 108 may be implemented as a server 200 (as illustrated in FIG. 2), or the like, and can be geographically diverse from one another such as located at various data centers around the country or globe. For illustration purposes, the cloud-based system 100 can connect to a regional office 110, headquarters 120, various employee's homes 130, laptops/desktops 140, and mobile devices 150 each of which can be communicatively coupled to one of the cloud nodes 102 via the Internet 104. These locations 110, 120, 130 and devices 140, 150 are shown for illustrative purposes, and those skilled in the art will recognize there are various access scenarios to the cloud-based system 100 all of which are contemplated herein.

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud." The cloud-based system 100 is illustrated herein as one exemplary embodiment of a cloud-based system, and those of ordinary skill in the art will recognize the systems and methods described herein contemplate operation with any cloud-based system.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

In an exemplary embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, malware detection, bandwidth control, Data Leakage Prevention (DLP), zero-day vulnerability protection, web 2.0 features, and the like. In an exemplary embodiment, the cloud-based system 100 may be viewed as Security-as-a-Service through the cloud, such as the IA.

In an exemplary embodiment, the cloud-based system 100 can be configured to provide mobile device security and policy systems and methods. The mobile device 150 may be similar to the server 200 (as illustrated in FIG. 2) and may include common devices such as laptops, smartphones, tablets, netbooks, personal digital assistants, MP3 players, cell phones, e-book readers, and the like. The cloud-based system 100 is configured to provide security and policy enforcement for devices including the mobile devices 150 in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, geographical distribution of the cloud nodes 102, policy shadowing of users which is dynamically available at the cloud nodes 102, etc.

As a cloud-based security system, the cloud-based system 100 has a distributed network, multi-tenant architecture. The cloud-based system 10 is configured to examine traffic over all ports and protocols including SSL encrypted traffic. The policies are configured to follow the user, regardless of their location or device. The cloud-based system 100 can provide security functionality combining findings from various different approaches to deliver a holistic perspective. The cloud-based system 100 can be capable of recognizing threats independent of signature feeds, and the cloud-based system 100 can propagate threat information across the cloud in real-time, i.e., zero-day or zero-hour determinations such as between the cloud nodes 102 and the central authority 106.

The objective of the cloud-based system as a cloud-based security system is a multi-tenant (multiple users, companies, etc. on the same platform) and highly scalable system through functionally distributes components of a standard proxy to create a giant global network that acts as a single virtual proxy. The user can go to any gateway (cloud node 102) at any time for policy-based secure Internet access. Two exemplary services for the cloud-based system 100 can include Zscaler Internet Access (which can generally be referred to as Internet Access (IA)) and Zscaler Private Access (which can generally be referred to as Private Access (PA)), from Zscaler, Inc. (the assignee of the present application). The IA service can include firewall, threat prevention, Deep Packet Inspection (DPI), DLP, and the like. The PA can include access control, micro service segmentation, etc. For example, the IA service can provide a user with Internet Access and the PA service can provide a user with access to enterprise resources in lieu of traditional Virtual Private Networks (VPNs).

The central authority 106 is a supervisory management node, i.e., the "brains" of the cloud-based security system. The central authority 106 manages and monitors all cloud nodes 102 and ensures that they are always up-to-date with the latest real-time feeds and software and that they are synchronized to propagate threat intelligence cloud-wide. The central authority 106 directs users to the closest cloud node 102, ensuring that policy follows the user with minimum latency. The central authorities 106 are a globally distributed peer-to-peer cluster with an automatically elected master. This ensures all cloud components can always talk to a central authority 106 even if there are major Internet 104 outages that isolate an entire region. Through its multi-tenant architecture, the central authority 106 provides each organization with its own secure portal to administer policy. Any change to the policy is communicated to the cloud nodes 102 within seconds. The central authority 106 provides an end-user authentication framework through integration with Secure Lightweight Directory Access Protocol (LDAP) or ID Federation systems.

The cloud nodes 102 are configured to interface traffic with the users, e.g., the locations 110, 120, 130 and devices 140, 150. The cloud nodes 102 are configured to perform security, management, and compliance policies for the users, with the policies served by the central authority 106. The cloud nodes 102 can be an inline proxy that enforces policies on a user-level granularity. The cloud nodes 102 can scan every byte of a request, content, responses, and all related data for inline blocking of threats like viruses, cross site scripting (XSS), and botnets. This capability also enables Dynamic Content Classification (DCC) of unknown sites. By scanning each page, the cloud nodes 102 can determine a risk index for every page loaded that enables administrators to control content served to their users based on acceptable risk. The cloud nodes 102 can include authentication and policy distribution mechanisms that enables any user to connect to any cloud node 102 at any time enabling enterprises to simply point traffic to any cloud node 102 to ensure full policy enforcement while getting all reports back in real-time.

The log nodes 108 can be integrated with the cloud nodes 102 or separate. The log nodes 108 are configured to maintain logs of all user transactions, in a compressed manner. The logs can be transmitted every second to the log nodes 108 over secure connections from the cloud nodes 102, as well as a multicast to multiple servers for redundancy. The log nodes 108 provide an administrator with real-time reports and the capability to query complete transaction-level details for any user, department, or location at any time in seconds. Data privacy and security are fundamental to any multi-tenant architecture. The cloud-based security system can provide privacy protection at a transaction level by avoiding any storage of transaction content. For example, transaction content is never written to disk but takes place in memory. The log nodes 108 can store and transfer logs in an encrypted format.

Exemplary Server Architecture

Referring to FIG. 2, in an exemplary embodiment, a block diagram illustrates a server 200 which may be used in the cloud-based system 100, in other systems, or standalone. For example, the cloud nodes 102, the central authority 106, and/or the log nodes 108 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Mobile Device Architecture

Figure 3:
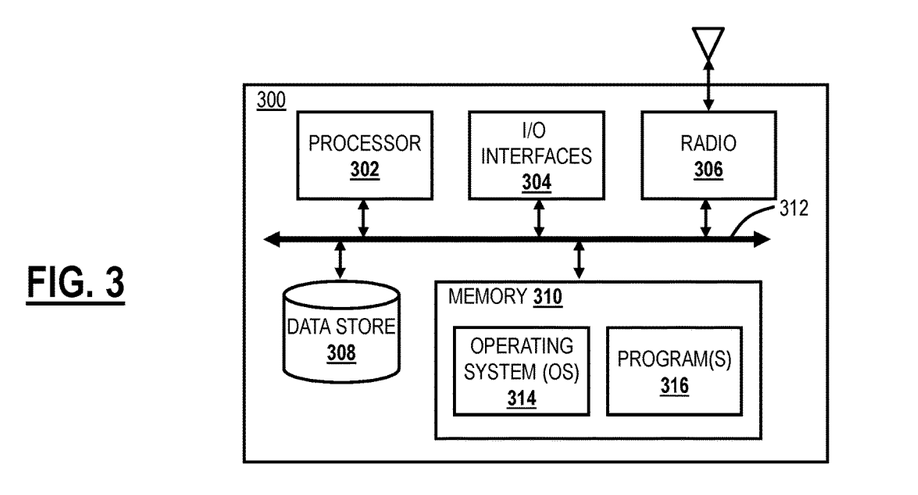

Referring to FIG. 3, in an exemplary embodiment, a block diagram illustrates a mobile device 300, which may be used in the cloud-based system 100 or the like. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an exemplary embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 310. Additionally, the I/O interfaces 304 may further include an imaging device, i.e. camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the mobile device 300. For example, exemplary programs 316 may include, but not limited to, a web browser, social networking applications, streaming media applications, games, mapping and location applications, electronic mail applications, financial applications, and the like. In a typical example, the end user typically uses one or more of the programs 316 along with a network such as the cloud-based system 100.

DNS Tunneling

Again, DNS tunneling is a method of using DNS queries and responses for communication by other programs or protocols to bypass a firewall or other network security. For DNS tunneling to work, the end DNS nameserver must be a modified name server than can extract and process data from the DNS queries. However, not all DNS tunneling traffic is malicious. For example, some security vendors use DNS tunneling for software and other updates. However, hackers and other rogue entities use a variety of DNS tunneling utilities as well as known malware that uses DNS as their communication channel. While each approach varies on the specifics of their operation, they all transmit data encoded in the payload of DNS.

Because DNS is rarely monitored and analyzed, hackers are able to use DNS tunneling to slip under the radar until something else draws attention to the breach. For example, here is a usual sequence of activities. A client sends a request for a particular host name in a domain, with the data/response to the server encoded in the hostname being requested. The server responds with its data in the RDATA field of the response. RDATA in DNS is data of type-specific relevance, such as the IP address for address records, or the priority and hostname for Mail Exchange (MX) records (RFC 1035). Because DNS allows host names of up to 255 characters, with each label (subdomain) limited to 63 characters, DNS allows the client to use lengthy individual labels as well as multiple levels of subdomains to encode their data. For example, the client sends a query for an A record where the data is encoded in the host name such as:

MRZGS3TLEBWW64TFEBXXMYLMORUW4ZI.t.example.com

The server would respond with an answer as a Canonical Name record (CNAME) response such as:

WW2IDPOZQWY5DJNZSQ.t.example.com

The client now has two-way transactional communications to a compromised network. An attacker can transfer files out of the network or have complete remote access to the compromised system.

DNS as a Data Network Channel

Any kind of data channel manifests certain properties, including DNS tunnels. These properties and define and classify the type of data channel. Some of the important properties of a typical data channel are described herein and their typical impact on DNS tunneling. These properties can be calculated at the authoritative nameserver level. In the example above, it should be done at t.example.com since t.example.com is the end point for the DNS tunnel. The foregoing describes characteristics (properties) of the DNS tunnel as a data channel. These properties can be measured through the systems and methods and used to characterize the DNS tunnel. As described herein, the properties are detected and characterized by a DNS tunnel detection system. The DNS tunnel detection system can be part of the cloud-based system 100 performing inline monitoring and detection. Also, the DNS tunnel detection system can be an offline detection system, such as the log node 108 or the like which detects DNS tunnels based on log data.

Network Traffic Volume (Bandwidth)

Figure 4:
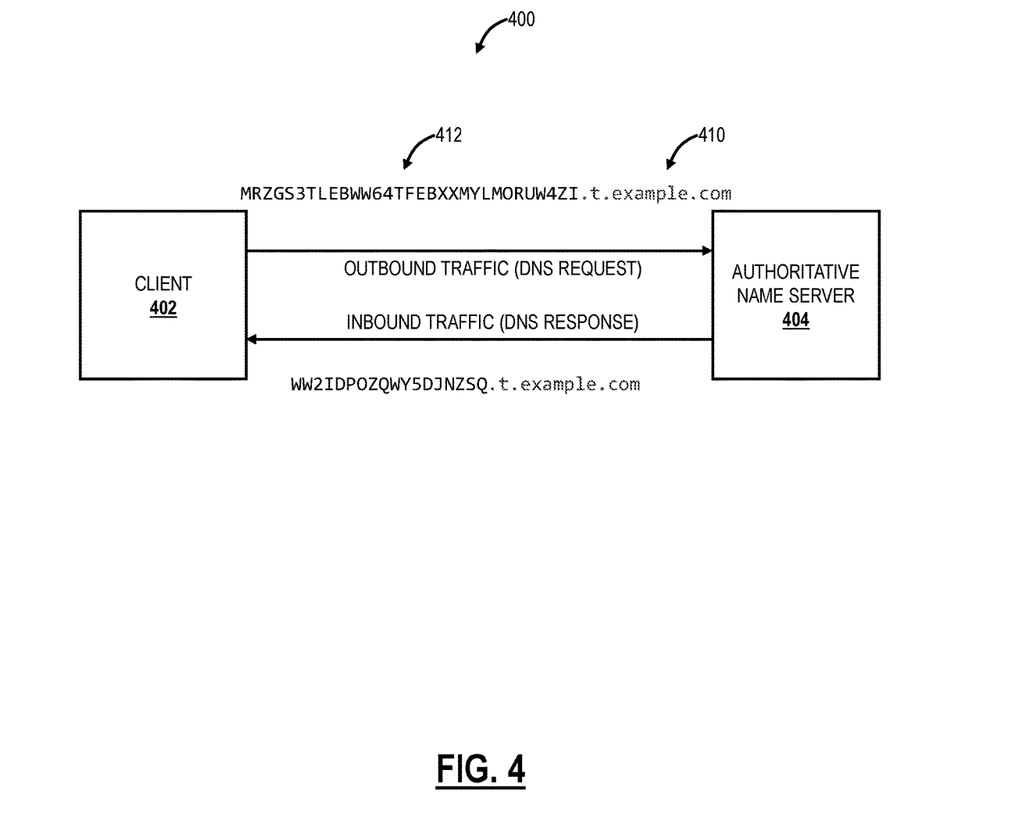
FIG. 4 is a network diagram of a network with a client communicatively coupled to an authoritative DNS name server.

Referring to FIG. 4, in an exemplary embodiment, a network diagram illustrates a network 400 with a client 402 communicatively coupled to an authoritative DNS name server 404. Traffic volume represents the amount of data being transferred in a given interval of time. For example, 100 bytes/sec represents a traffic where each second there are 100 bytes of data transferred. The larger the traffic volume, more the number of bytes per time interval. In the case of the DNS protocol, the outbound traffic is the DNS request. The number of bytes transferred can be estimated by calculating the length of the DNS request. Typically, the entire length of the request may not be the payload since domain component is fixed.

In FIG. 4, a fixed domain component 410 is t.example.com and actual data exchange is through a subdomain component 412. Here, the DNS request is 31 bytes, and the DNS response is 18 bytes. The DNS request is limited to a length of 256 bytes including the fixed domain component 410. So, effectively the amount of outbound bytes the client 402 can transfer in a single request would be less than 256 bytes.

To create a channel, the client 402 would make multiple DNS requests to the authoritative DNS name server 404 as well as receiving multiple DNS responses. To determine the traffic volume, the bytes from all the DNS requests from a given client can be added together for a fixed time window. For example, add all the DNS requests and DNS responses over a five minute window, and to get the effective traffic bandwidth, divide by 300 (5 minutes=300 seconds).

A group of bytes being transferred alone does not by itself convey information. To convey information, there should be sufficient variation (randomness) in the data. For example, requesting my.example.com a thousand times does not convey any meaning to the DNS tunnel detection system, e.g., each request is about the same size. However, if one were to make all the 1000 calls with different subdomains, then much more information would be transferred.

One of the ways to look at the variation in traffic size is to look at entropy. Mathematically entropy is a logarithmic measure of the rate of transfer of information in a particular message or language. An approach for entropy calculation is Shannon's entropy. For a given data transfer channel, Shannon's entropy can be calculated on each message. In the case of DNS tunneling, the DNS tunnel detection system can determine entropy for each DNS request (the variable subdomain component) and DNS response. The entropy of the channel is the average (or some statistical measure) entropy of all messages exchanged. The DNS tunnel detection system can also define a fixed window over which to calculate the average. The average entropy can be calculated while doing the bandwidth calculation.

The quality of information also can be found by analyzing the variation in the DNS requests itself. Here the DNS tunnel detection system is not just looking at the individual DNS request or DNS response, but from a channel perspective, the DNS tunnel detection system is looking at the variation among the DNS requests and DNS responses. For example, thousands of requests of someinfo.t.example.com (or the like) will convey much less information than 1000 requests to *.t.example.com where * represents unique subdomain for each DNS request. As described herein, the DNS tunneling detection system introduces a metric called Replication factor (R) which gives a quantitative representation of the DNS request variation.

The number of clients refers to all systems making DNS requests. A popular DNS server such as Google's DNS servers will receive a lot of DNS requests. One observation relied upon by the DNS tunneling detection system is a DNS server serving DNS tunnels will likely have a lower number of clients communicating with it than one without DNS tunnels. Also at Internet scale, a large number of clients signify a popular domain such as Google, Yahoo, etc. Thus, the number of clients for DNS requests can be used to filter out popular Internet domains and narrow down the number of possible domains for malicious DNS tunneling monitoring.

The authoritative DNS name server 404 is a name server (DNS Server) that holds the actual DNS records. In the case of DNS tunneling, it serves as one of the endpoints for the tunnel. A server will typically establish tunnels with multiple clients.

DINS Tunneling Detection

In the detection process performed by the DNS tunneling server, assume the DNS tunneling server does not have the authoritative name server information for a given DNS query. The detection process will determine the most likely authoritative DNS name server 404 for the given set of DNS queries.

For the detection process, a set of metrics and way to calculate them are defined, and the results represent how likely a given hostname is acting as an endpoint for a DNS tunnel. Also, the detection process starts with the assumption that for all queries the authoritative DNS name server 404 is not known.

For each time window defined by W, the detection process includes a determination of the following values.
H=The hostname for which the score is calculated
N=Number of DNS queries for H in time window W
S=Number of Unique Subdomain seen for H
C=Number of Unique clients making DNS queries for H The outbound traffic $T_{out}$ for hostname H in time window W is given by, $$T_{out} = \sum_{i=0}^{i=N} \text{Length}(\text{Request}_i)$$

Specifically, the outbound traffic $T_{out}$ for hostname H in time window W is the amount, in bytes, of DNS requests to the hostname H. The inbound traffic $T_{in}$ for hostname H in time window W is given by, $$T_{in} = \sum_{i=0}^{i=N} \text{Length}(\text{Response}_i)$$

Similarly, the in-bound traffic $T_{in}$ for hostname H in time window W is the amount, in bytes, of DNS responses from the hostname H. The average entropy $E_{avg}$ for hostname H in time window W is given by, $$E_{avg} = \frac{\sum_{i=0}^{i=N} \text{Entropy}(\text{Request}_i)}{N}$$

Again, the entropy of each request can be determined using various approaches, such as Shannon's entropy. The average entropy $E_{avg}$ for hostname H in time window W represents the average entropy of all the DNS requests in the time window. A Repeatability factor gives the variations in the DNS requests. For hostname H in time window W, it is given by $$R = \frac{S}{N}$$

The computed score for hostname H for time window W can be given by $$\text{Score} = \frac{R \times E_{avg} \times \ln(T_{out} + T_{in})}{C}$$

Those skilled in the art will recognize the computed score is one approach to characterize all DNS requests and DNS responses associated with the hostname H in the time window W. Other approaches are also contemplated. Importantly, the computed score provides more details than simply analyzing individual DNS requests and DNS responses for DNS tunneling. That is, the computed score accounts for all DNS requests and DNS responses over time as well as accounting for entropy and repeatability.

As mentioned above, the detection process does not assume the hostname H is the authoritative DNS name server 404. A typical domain will have multiple subdomains. All subdomains may not be serving as an endpoint for DNS tunnel traffic. Only a select few subdomains may be dedicated towards DNS tunneling.

Figure 5:
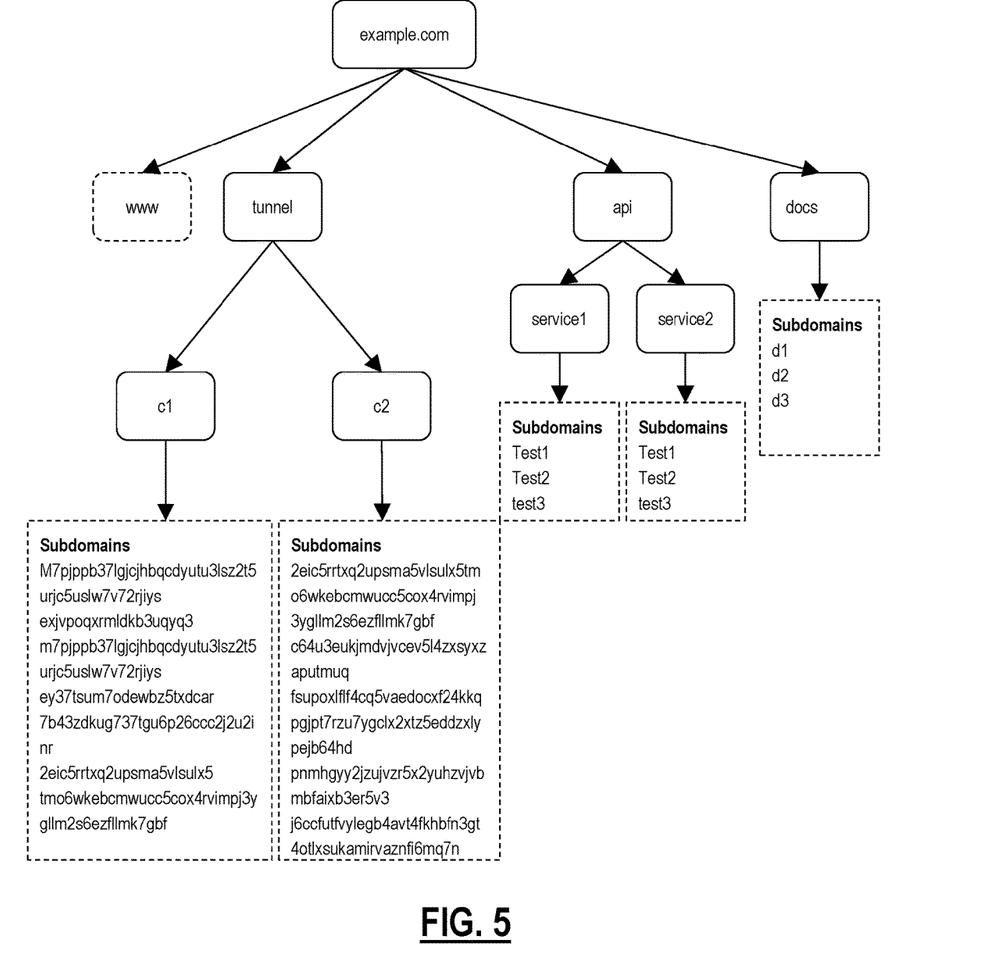
FIG. 5 is a diagram of a tree for an exemplary domain, example.com, and a collection of DNS requests to example.com and associated subdomains.

Referring to FIG. 5, in an exemplary embodiment, a diagram illustrates a tree for an exemplary domain, example.com, and a collection of DNS requests to example.com and associated subdomains. Due to lack of the authoritative DNS name server 404 information, it will be difficult to narrow the exact hostname that is serving the tunnel information. In this example, the authoritative DNS name server 404 for the tunnel data would be c1.tunnel.example.com and c2.tunnel.example.com.

Figure 6:
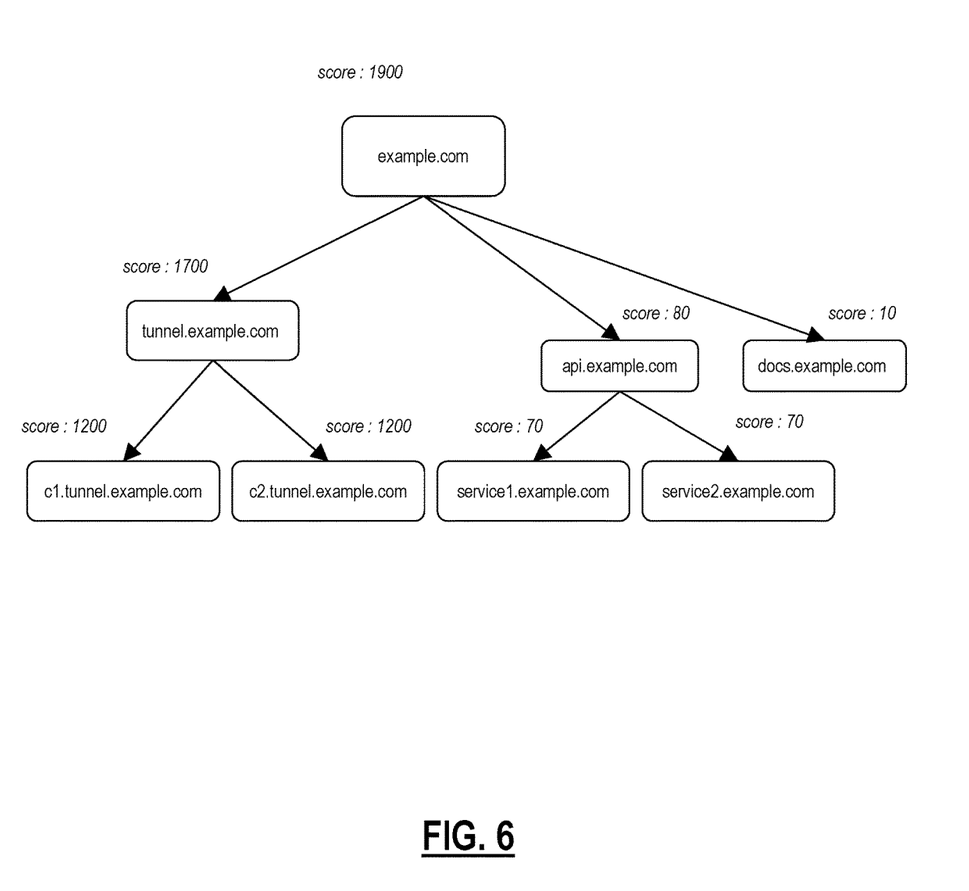
FIG. 6 is a diagram of a combination of hostnames from the exemplary domain in FIG. 5.

To find the closest possible hostname for a DNS tunnel endpoint, the detection process includes calculating the score for all possible hostnames. The possible list of hostnames for a given DNS request is formulated by excluding the first prefix and then considering remaining prefix combinations. For example, DNS request: test1.service1.api.example.com
service1.api.example.com (first prefix is dropped)
api.example.com
example.com
DNS request: M7pjppb37lgjcjhbqcd.c1.tunnel.example.com
c1.tunnel.example.com (first prefix is dropped)
tunnel.example.com
Example.com Once the detection process has all combinations of the hostnames for given DNS requests, the detection process includes calculating the score for each of those combinations using the approached outlined earlier. Referring to FIG. 6, in an exemplary embodiment, a diagram illustrates a combination of hostnames from the exemplary domain in FIG. 5. Also, an exemplary computed score is shown for each hostname. The computed score is obtained as described herein for a time window. The computed score value is for representation only. Also, note that the score of the parent node (example.com) is not the sum of the scores if its child nodes. (tunnel.example.com, c1.tunnel.example.com, etc.). In fact, a child node can have a higher score than a parent node (although this is not the case in FIG. 6).

The computed score value intuitively is a representation of the amount of information transferred using DNS queries per client. Generally, the higher score values indicate a likelihood the given hostname was used for transferring information. There is no maximum possible for the score value since the traffic pattern for DNS queries can vary largely. Moreover, due to the scale of the Internet, it is virtually impossible to put a cap on attributes such as the number of clients making the requests or the number of requests the server can handle per second.

The computed score can be periodically or continuously determined via the DNS tunneling detection system. Again, the DNS tunneling detection system can operate inline such as through the cloud-based system 100 or offline by analyzing log data such as in the log node 108. Other embodiments are also contemplated. Of note, the computed scores are seen across a wide range of DNS servers serving clients. The computed scores can be used to determine where it is necessary to perform additional monitoring, such as where a possible DNS tunnel operates. In this manner, a distributed security system such as the cloud-based system 100 can identify and characterize the DNS tunnel traffic. For example, a high score is indicative of a DNS tunnel and the distributed security system can perform monitoring of a suspected DNS tunnel, e.g., for content filtering, spam filtering, uniform resource locator (URL) filtering, antivirus protection, malware detection, bandwidth control, DLP, zero-day vulnerability protection, web 2.0 features, and the like. Thus, the distributed security system can then correlate traffic activities with computed scores. This process can be continuous, and the distributed security system can continue to gain insights into what different scores mean for DNS tunnels. Also, the distributed security system can identify the authoritative DNS name server(s) 404 for domains based on the computed score.

In the example of FIG. 6, the DNS tunneling detection system can identify example.com, tunnel.example.com, c1.tunnel.example.com, and c2.tunnel.example.com as the authoritative DNS name servers 404, based on the associated scores of 1900, 1700, 1200, 1200. The DNS tunneling detection system can detect the likely presence of DNS tunnels on these associated servers. On the other hand, servers aoi.example.com, docs.example.com, service1.example.com, and service2.example.com likely do not have DNS tunnels thereon based on their lower scores. From a security monitoring perspective, the distributed security system can provide additional monitoring on the DNS traffic from the servers—example.com, tunnel.example.com, c1.tunnel.example.com, and c2.tunnel.example.com.

DNS Detection System

Figure 7:
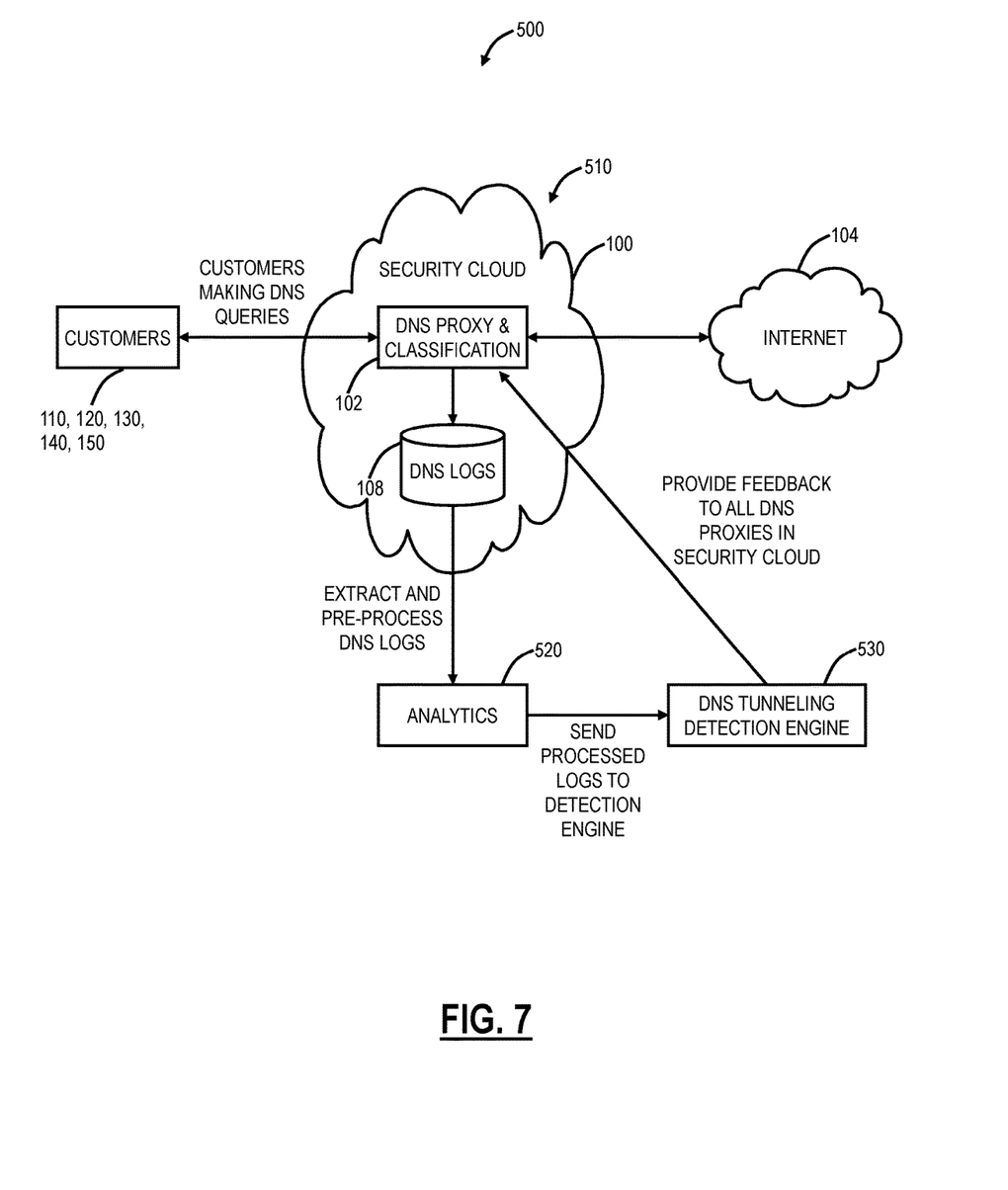
FIG. 7 is a block diagram of a DNS detection system which can implement the DNS tunnel detection process described herein and direct monitoring by a distributed security system.

Referring to FIG. 7, in an exemplary embodiment, a block diagram illustrates a DNS detection system 500 which can implement the DNS tunnel detection process described herein and direct monitoring by a distributed security system 510. The DNS detection system 500 can be part of and/or connected to the cloud-based system 100 with the cloud-based system 100 operating as the distributed security system 510. Those skilled in the art will recognize other embodiments are also contemplated to implement the DNS detection process described herein. In this exemplary embodiment, the locations 110, 120, 130 and the devices 140, 150 are connected to one or more cloud nodes 102 in the cloud-based system 100. The cloud nodes 102 can perform as a DNS proxy and provide classification. For example, customers of the distributed security system 510 (i.e., the locations 110, 120, 130 and the devices 140, 150) can use the DNS proxy by the cloud node 102 to firewall DNS traffic and all traffic going through the cloud node 102 is logged, e.g., to the log node 108.

The DNS detection system 500 includes an analytics engine 520 which can be configured to fetch DNS logs from the log nodes 108, process the data, and provide the processed data to a DNS tunneling detection engine 530. The DNS tunneling detection engine 530 can perform the approach described herein (or similar) to score various host names and classify if it has supporting tunnel traffic or not. The DNS tunneling detection engine 530 is further connected to the distributed security system 510 to provide feedback such as to the cloud nodes 102. The feedback can identify and classify DNS tunnels to the cloud nodes 102, and the DNS tunnels can be subject to monitoring as well as blocked by the cloud nodes 102. These operations can occur both inline as well as offline. The feedback mechanism between the DNS tunneling detection engine 530 and the cloud nodes 102 can be near real-time, i.e., once a tunnel hostname is detected, the information can be propagated to all of the cloud nodes 102 (DNS proxy servers). The cloud nodes 102 (DNS proxy server) can perform various actions associated with DNS based on the customer's configuration, such as block, allow, notify, monitor, etc.

Figure 8:
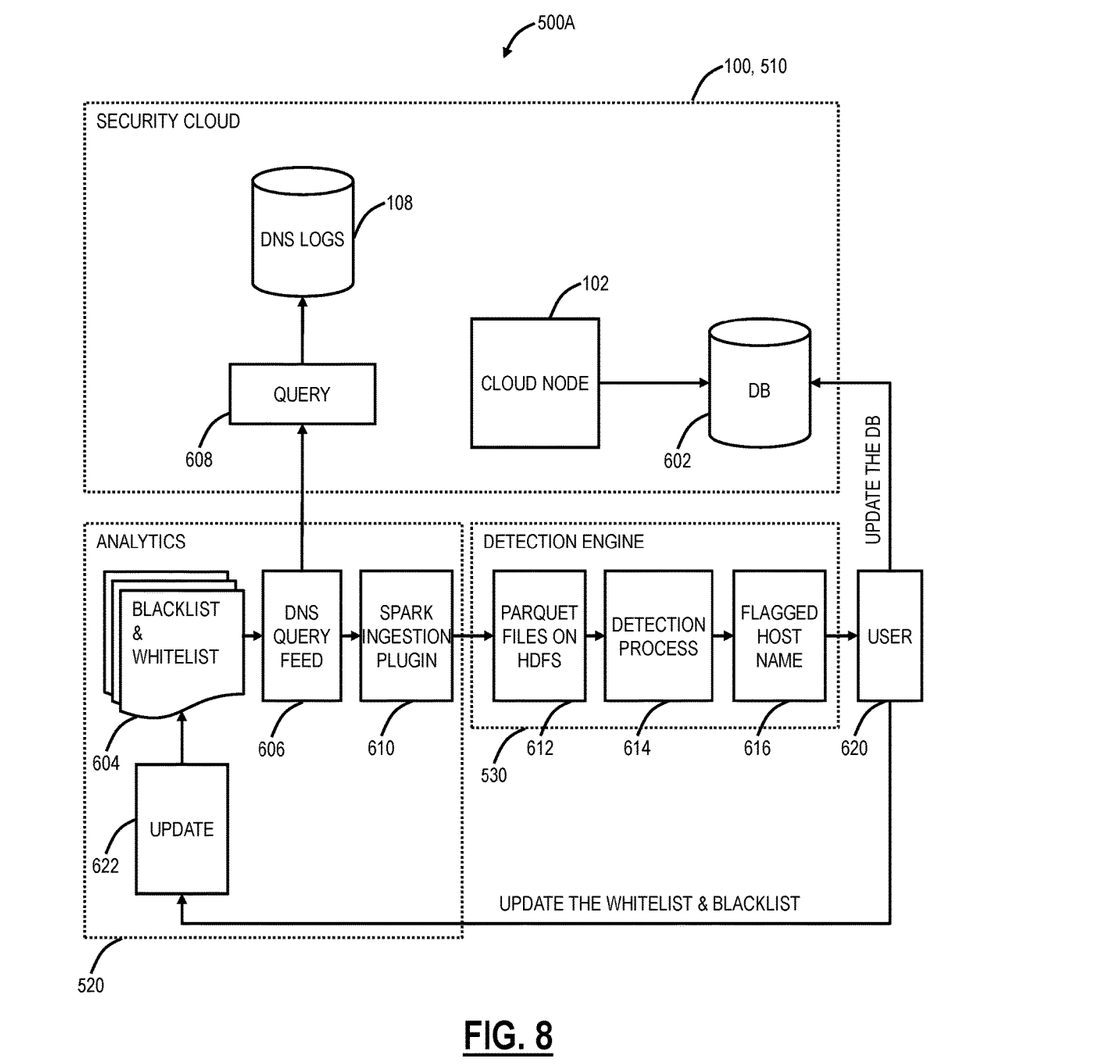
FIG. 8 is a block diagram of an exemplary implementation of a DNS detection system from FIG. 7.

Referring to FIG. 8, in an exemplary embodiment, a block diagram illustrates an exemplary implementation of a DNS detection system 500A. The DNS detection system 500A is an exemplary implementation of the DNS detection system 500, and those skilled in the art will recognize other implementations are contemplated. Further, other architectures are also contemplated for implementing the DNS detection process. The distributed security system 510 (in the cloud-based system 100) includes the cloud node 102 connected to a database 602 and the log nodes 108 connected to the cloud node 102. The analytics engine 520 can include a whitelist/blacklist 604 which is used to designate good (whitelist) and bad (blacklist) hostnames with respect to DNS tunneling.

In operation, the analytics engine 520 is configured to perform a DNS query feed 606 to query 608 the log nodes 108. In an exemplary embodiment, the query 608 can be a form of a Structured Query Language (SQL) query that extracts required columns from the log node 108 from the DNS logs. The query 608 can be run periodically, such as daily, for the purposes of identifying which hostnames are likely DNS tunnel hosts.

The log node 108 can be configured to extract required data from the DNS logs for purposes of computing the scores as described herein. In an exemplary embodiment, the cloud nodes 102 as the DNS proxy maintain logs of time, source IP address, DNS request type, DNS request, domain categories, domain class, etc. Also, the query 608 can be based on the whitelist/blacklist 604, i.e no need to obtain data for whitelist domains.

The DNS query feed 606 can provide the output from the query 606 to the DNS detection engine 530 via a Spark Ingestion plugin 610. In an exemplary embodiment, the DNS detection engine 530 can use Apache Spark and Apache Hadoop HDFS. The data from the analytics engine 520 can be Parquet files on HDFS 612. The DNS detection engine 530 can implement a detection process 614 which computes the scores for each hostname and determines/flags 616 hostnames suspected of having DNS tunnels. The detection process 614 can utilize the approach described herein to determine scores for each hostname based on the data from the query 608. In an exemplary embodiment, the detection process 615 can be implemented in Python. The output of the detection process 614 is a list of hostnames the detection process 614 likely considers as having DNS tunnel traffic. The output can be presented to a user 620, e.g., an administrator of the hostnames or the distributed security system 510. The user 620 can decide if the given host names in the output are tunnel traffic and then update the database 602 for the cloud nodes 102. Also, the user 620 can be omitted, and this process can be automated. Further, the output can be used to update 622 the whitelist/blacklist 604. In an exemplary embodiment, the detection process 614 operates periodically such as once per day.

Note, while the output is shown presented to the user 620 in FIG. 8, the output can also be characterized inline automatically without user intervention. That is, in an exemplary embodiment, the user 620 is omitted and the flagged host names suspected of having DNS tunnels are directly provided to the database 602 possibly based on an automatic analysis without the user 620.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of detecting Domain Name System (DNS) tunneling, the method comprising:
obtaining data related to DNS traffic between a plurality of DNS nameservers and a plurality of clients over a period of time, wherein the step of obtaining data is performed by a distributed security system with one or more cloud nodes operating as DNS proxies for the clients;
logging, in a log node, the data related to the DNS traffic obtained over the period of time;
fetching, from the log node, the data related to the DNS traffic obtained over the period of time;
for each DNS nameserver, processing the data fetched from the log node to determine a score based on the data related to the DNS traffic for the respective DNS nameserver, the score configured to characterize DNS queries from one or more clients of the plurality of clients to the respective DNS nameserver over the period of time, wherein each score incorporates all DNS queries associated with the respective DNS nameserver over the period of time;
analyzing the scores of the plurality of DNS nameservers to determine if one or more of the plurality of DNS nameservers has a score indicating that the respective DNS nameserver is suspected of being subjected to DNS tunneling;
further monitoring the one or more DNS nameservers suspected of being subjected to DNS tunneling to determine if DNS tunneling is actually occurring on the one or more DNS nameservers; and
blocking the DNS tunneling through the distributed security system.

2. The method of claim 1, wherein each score is a combination of DNS traffic length of both DNS queries and responses, entropy of each DNS query, variation of each DNS query, and a number of unique clients.

3. The method of claim 1, wherein the scores are determined for all possible hostnames observed in a domain.

4. The method of claim 1, wherein each score in part represents a number of the clients to an associated DNS nameserver such that the number of clients is used to narrow detection of the DNS tunneling.

5. The method of claim 1, wherein each score in part accounts for entropy of each DNS query and variation of each DNS query to determine the DNS tunneling based thereon.

6. The method of claim 1, wherein an authoritative DNS nameserver for a particular domain is unknown and determined based on the scores.

7. The method of claim 1, wherein the steps of obtaining data, determining the scores, and comparing the scores are performed periodically, and the method further comprises:
updating a distributed security system for further monitoring the one or more selected DNS nameservers.

8. A Domain Name System (DNS) tunnel detection engine, the DNS tunnel detection engine comprising:
a network interface;
a processor communicatively coupled to the network interface; and
memory storing executable instructions, cause the processor to:
obtain data related to DNS traffic between a plurality of DNS nameservers and a plurality of clients over a period of time, wherein the data is obtained by a distributed security system with one or more cloud nodes operating as DNS proxies for the clients;
log the data related to the DNS traffic obtained over the period of time;
fetch the data related to the DNS traffic obtained over the period of time;
for each DNS nameserver, process the fetched data to determine a score based on the data related to the DNS traffic for the respective DNS nameserver, the score configured to characterize DNS queries from one or more clients of the plurality of clients to the respective DNS nameserver over the period of time, wherein each score incorporates all DNS queries associated with the respective DNS nameserver over the period of time;
analyze the scores of the plurality of DNS nameservers to determine if one or more the plurality of DNS nameservers has a score indicating that the respective DNS nameserver is suspected of being subjected to DNS tunneling;
further monitor the one or more DNS nameservers suspected of being subjected to DNS tunneling to determine if DNS tunneling is actually occurring on the one or more selected DNS nameservers; and
provide notification the DNS tunneling is actually occurring to the distributed security system for blocking the DNS tunneling through the distributed security system.

9. The DNS tunnel detection engine of claim 8, wherein each score is a combination of DNS traffic length of both DNS queries and responses, entropy of each DNS query, variation of each DNS query, and a number of unique clients.

10. The DNS tunnel detection engine of claim 8, wherein the scores are determined for all possible hostnames observed in a domain.

11. The DNS tunnel detection engine of claim 8, wherein each score in part represents a number of the clients to an associated DNS nameserver such that the number of clients is used to narrow detection of the DNS tunneling.

12. The DNS tunnel detection engine of claim 8, wherein each score in part accounts for entropy of each DNS query and variation of each DNS query to determine the DNS tunneling based thereon.

13. The DNS tunnel detection engine of claim 8, wherein an authoritative DNS nameserver for a particular domain is unknown and determined based on the scores.

14. A distributed security system configured to detect and monitor Domain Name System (DNS) tunnels, the distributed security system comprising:
a hardware processor communicatively coupled to one or more cloud nodes operating as DNS proxies for one or more clients;
a log node communicatively coupled to the one or more cloud nodes; and
a DNS tunneling detection engine configured to detect DNS tunneling, the DNS tunneling detection engine being communicatively coupled to the one or more cloud nodes and the log node, wherein the DNS tunneling detection engine is configured to
obtain data related to DNS traffic between a plurality of DNS nameservers and the one or more clients from the log node logged over a period of time, wherein the data is obtained by the one or more cloud nodes operating as DNS proxies for the clients;
for each DNS nameserver, process the data obtained from the log node to determine a score based on the data related to the DNS traffic for the respective DNS nameserver, the score configured to characterize DNS queries from the one or more clients to the respective DNS nameserver over the period of time, wherein each score incorporates all DNS queries associated with the respective DNS nameserver over the period of time;

analyze the scores of the plurality of DNS nameservers to determine if one or more of the plurality of DNS nameservers has a score indicating that the respective DNS nameserver is suspected of being subjected to DNS tunneling; and further monitor the one or more DNS nameservers suspected of being subjected to DNS tunneling to determine if DNS tunneling is actually occurring on the one or more DNS nameservers, wherein the one or more cloud nodes are configured to block the DNS tunneling.

15. The distributed security system of claim 14, wherein each score is a combination of DNS traffic length of both DNS queries and responses, entropy of each DNS query, variation of each DNS query, and a number of unique clients.

16. The distributed security system of claim 14, wherein the scores are determined for all possible hostnames observed in a domain.

17. The distributed security system of claim 14, wherein each score in part represents a number of the clients to an associated DNS nameserver such that the number of clients is used to narrow detection of the DNS tunneling.

* * * * *